US007347558B2

(12) United States Patent
Berman

(10) Patent No.: US 7,347,558 B2
(45) Date of Patent: Mar. 25, 2008

(54) 3D KERNEL AND PRISM ASSEMBLY DESIGN

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 236 days.

(21) Appl. No.: 11/170,124

(22) Filed: Jun. 29, 2005

(65) Prior Publication Data

US 2006/0007403 A1  Jan. 12, 2006

Related U.S. Application Data

(60) Provisional application No. 60/587,616, filed on Jul. 12, 2004.

(51) Int. Cl.
G03B 21/14 (2006.01)
G03B 21/00 (2006.01)
G03B 21/28 (2006.01)
G02B 5/04 (2006.01)

(52) U.S. Cl. .............................. 353/20; 353/31; 353/33; 353/81; 353/121; 359/834; 359/837

(58) Field of Classification Search .................. 353/33, 353/81, 20, 31, 34, 37, 121; 348/757, 761, 348/762, 744; 359/831, 833, 834, 837
See application file for complete search history.

(56) References Cited

U.S. PATENT DOCUMENTS 5,130,826 A * 7/1992 Takanashi et al. ............. 349/9
5,864,374 A * 1/1999 Ito et al. ...................... 348/757
6,078,363 A * 6/2000 Masuda et al. ............. 348/752
6,340,230 B1 * 1/2002 Bryars et al. .................. 353/31
6,375,330 B1 * 4/2002 Mihalakis ..................... 353/31
6,457,831 B1 * 10/2002 Chuang et al. ............... 353/33
7,150,532 B2 * 12/2006 Kim et al. ..................... 353/20
7,198,371 B2 * 4/2007 Ishizaka et al. .............. 353/20
2006/0114416 A1 * 6/2006 O'Donnell et al. ........... 353/20

* cited by examiner

Primary Examiner—Melissa Jan Koval
(74) Attorney, Agent, or Firm—Martine Penilla & Gencarella, LLP

(57) ABSTRACT

A Liquid Crystal on Silicon (LCOS kernel for a light engine is configured in a kernel having light paths in three dimensions (3D kernel). The 3D kernel allows for designs that do not require Wavelength Dependent Waveplates (WDWs) (or Wavelength Specific Retarders) for managing light polarizations within the 3D kernel. In one embodiment, the 3D kernel includes a Polarizing Beam Splitter (PBS) that is positioned to direct lightpaths within the 3D kernel in the $3^{rd}$ dimension (e.g., light path planes perpendicular to planes of input light provided to the 3D kernel). The $3^{rd}$ dimension is, for example, an output light path perpendicular to an input light plane. The 3D kernel allows for designs that incorporate reflective LCOS microdisplays and management of light paths without WDWs. The kernel is suitable for use in High Definition (HD) LCOS Rear Projection Televisions (RPTVs) and other projector applications.

13 Claims, 3 Drawing Sheets

Configuration Appropriate for Microdisplays in the Portrait Orientation

Configuration Appropriate for Microdisplays in the Landscape Orientation

3D KERNEL AND PRISM ASSEMBLY DESIGN

Cross Reference To Related Applications and Claim of Priority

This invention claims priority to the following co-pending U.S. provisional patent application, which is incorporated herein by reference, in its entirety:

Berman, Provisional Application Ser. No. 60/587,616, entitled "A 3d Kernel and Prism Assembly Design,".

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to projection monitors, displays, televisions, and other display systems. The invention is more particularly related to a kernel design used to impart an image into a light beam by separating the light beam into its component colors, individually modulating each component color, and then re-combining the modulated component colors into an output beam.

2. Discussion of Background

The function of a video projector and the prism assembly that is contained within it are explained with reference to FIG. 1. As shown, white light is generated by the light source. The light is collected, homogenized and formed into the proper shape by the condenser. UV and IR components are eliminated by filters. In this example, white light then enters a prism assembly where it is polarized and broken into red, green and blue beams. (Hence a "three channel", quad type prism assembly.) These beams then follow different paths within the prism assembly such that each beam is directed to a specific reflective microdisplay. The microdisplay that interacts with the green beam contains the green content of the full color video image. It is similar for the blue and red microdisplays. On a pixel-by-pixel basis, the microdisplays modulate and then reflect the colored light beams. The prism assembly then recombines the modulated beams into a white light beam that contains a full color video image. The resultant white light beam then exits the prism assembly and enters the projection lens. Finally, the image-containing beam is projected onto a screen.

Several prism assembly configurations have been discussed in the technical and patent literatures. Some of these configurations are based on WDW (Wavelength Dependent Waveplates, a.k.a., wavelength or band specific retarders), in that they use one or more WDWs to manipulate light within the prism assembly.

SUMMARY OF THE INVENTION

The present inventors have realized several needs for greater flexibility in the design of light engine kernels and prism assemblies. One of the needs is cost based in that certain components, such as WDWs, that are expensive to procure. A prism assembly and kernel designs with a reduced number, or free of WDWs potentially represents a significant cost savings in materials and manufacturing expenses.

In one embodiment, the present invention provides a prism assembly comprising a series of PBS devices (e.g., PBS cubes), wherein an output PBS device of the prism assembly is configured to direct a first light beam to a modulation beam splitter and then combine first light beam after being modulated by the modulation beam splitter with a second modulated light beam to produce an output beam. In one embodiment, the first light beam is a magenta light beam and the modulation beam splitter comprises a yellow dichroic beam splitter (or other beam splitting device) configured to split the magenta first light beam into red and blue component light beams directed toward red and blue processing faces of the modulation beam splitter and then recombine the split light beams after reflection from light modulators mounted on (or in conjunction with) the processing faces.

In one embodiment, the present invention is embodied in a PBS beam splitting cube (or other optic having a polarizing layer) such that the PBS beam splitting cube is configured to direct light beams to first and second processing faces and to combine light beams from the first and second processing faces with another light beam to produce an output light beam.

In one embodiment, the present invention comprises a color separating device that separates white polarized light into a first color beam comprising at least two primary colors and a second color beam comprising a third primary color, all of a same relative polarization. The first, second, and third primary color beams are modulated and then recombined by an output PBS device without the use of WDWs (or wavelength and/or band specific retarders).

In one embodiment, the present invention comprises a prism assembly configured to separate input light into component colors and modulate each of the color components with image data, and then recombine each modulated component color light beams into a single output beam, wherein the prism assembly is constructed without WDWS.

In one embodiment, the present invention comprises a kernel comprising a prism assembly comprising at least one polarizing beam splitter device and without any WDWs in light paths of the kernel.

In one embodiment, the present invention comprises a kernel comprising a prism assembly comprising at least one polarizing beam splitter device and without any WDWs; wherein the prism assembly is configured to separate input light into at least 3 component color light beams and modulate each of the color components with image data, and then recombine each modulated component color light beam into a single output beam, wherein the prism assembly is constructed without WDWS.

In one embodiment, the present invention is a kernel constructed without any WDWs and comprising an output Polarizing Beam splitter utilized to combine modulated light beams that enter the output polarizing beam splitter from different directions. In one embodiment, the different directions are 90 degrees opposed to each other. In one embodiment, the output beamsplitter combines the modulated light beams with a reflection of a first light beam and pass through of a second light beam. In one embodiment, the output beam splitter utilizes only a single reflection in combining the modulated light beams.

In one embodiment, the present invention includes a prism assembly comprising, an input beam splitter configured to split an incoming beam into a first color light beam and a second color light beam of a same polarization, a second beam splitter configured to modulate the second light beam in a manner such that the modulated light beam's polarization is rotated 90 degrees; a third beam splitter configured to split the first light beam into first and second component light beams, modulate and recombine the first and second component light beams in such a manner that a polarization of the first light beam (after modulation and recombination of the component light beams) is rotated 90 degrees; and an output beam splitter used to recombine the first and second (now modulated) light beams.

In one embodiment, the second light beam comprises two primary colors, and the first light beam comprises one primary color.

In one embodiment, the first light beam comprises a blue primary color.

In one embodiment, the first light beam comprises a green primary color.

In each of the embodiments, the kernel or prism assembly may be constructed without any Wavelength Dependent Waveplates (WDWs), or wavelength/band specific retarder materials.

The present inventors have also realized the placement and orientation of light modulators (e.g., reflective microdisplays) has significant impact on the ease of production of kernels. Therefore, significant cost savings can be gained from an orientation of microdisplays such that flex-tail portions common to modern microdisplay devices are easily lined up and attached to PCB components (e.g., a drive board) that provide video or other image signals to control modulation of light to the microdisplays. In one embodiment, the present invention is an orientation of microdisplays such that no more than a single 90 degree bend is required in only one of the microdisplay flex tails.

DESCRIPTION OF THE PREFERRED EMBODIMENTS

Figure 2:
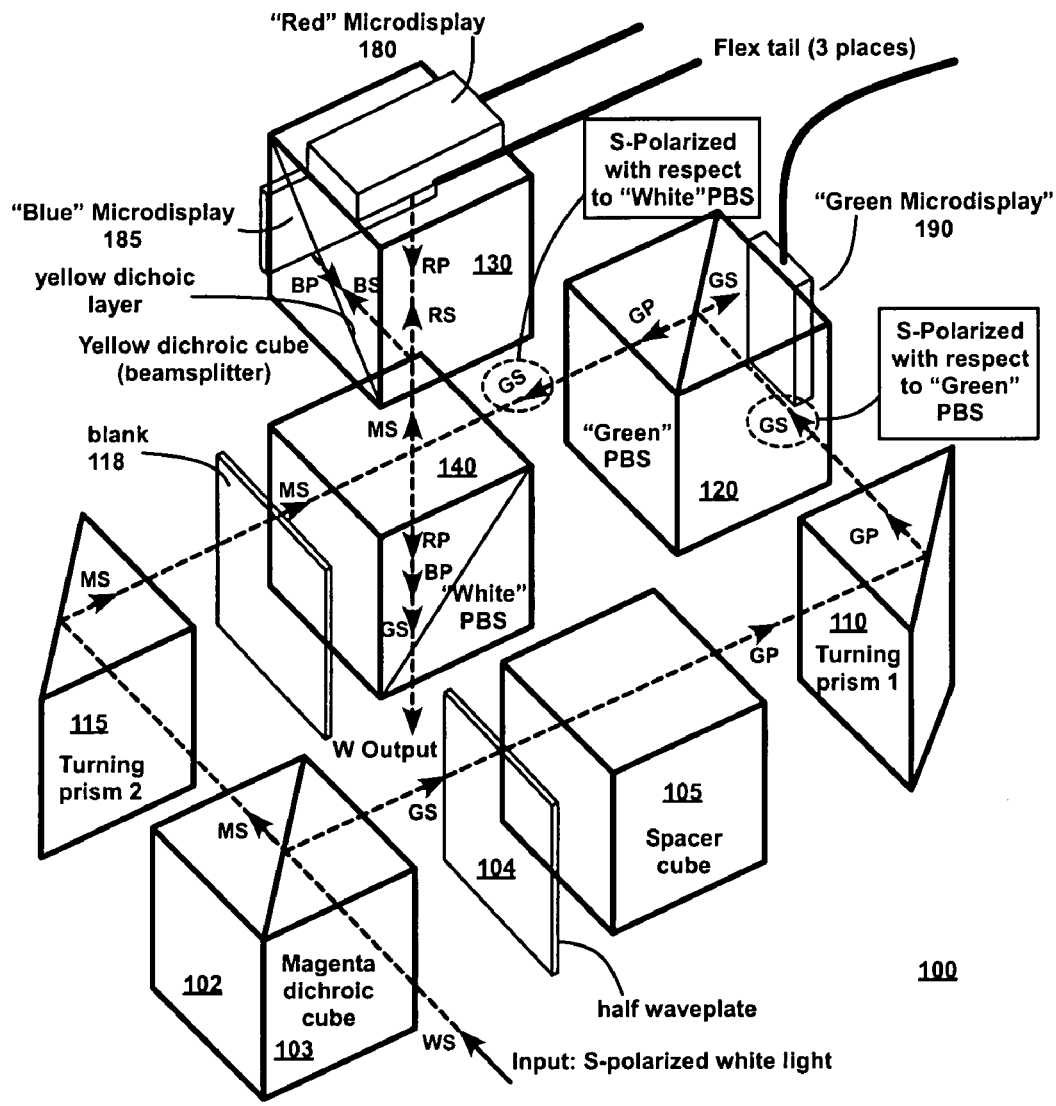
FIG. 2 is a drawing of a 3D kernel according to an embodiment of the present invention.

FIG. 2 a prism assembly 100 and kernel configuration (prism assembly plus attached microdisplays). Each component is named and the path and polarization of the light at each point within the prism assembly 100 is indicated. The color (e.g., R—red; G—green; B—Blue) indicates the color [or band] of the light ray. S and P represent the relative polarizations of the light (e.g., GS=Green light having a S relative polarization).

The prism assembly is composed of a number of transparent or glass optical components (e.g., 102, 105, 110, 115, 120, 130, and 140). Glass utilized in the prism assembly preferably has a low photoelastic constant. This assures that any stress built into or that develops during operation of the prism assembly will not induce birefringence or result in the introduction of visual artifacts in the image.

Upon detailed review of the present disclosure, it will be understood that certain parts utilized in the illustrated embodiments may substituted with other optical components. For example, turning prisms 115 and 110 may both be substituted with full mirrors. Magenta dichroic 102 cube may be substituted with an optical flat coated with the corresponding dichroic material. In addition, optical channels may be of different colors as determined by the dichroic layer in the input beam splitter when coupled with correspondingly different colored microdisplays (image content provided to the microdisplays) and appropriate dichroic layer placed in beamsplitter 130.

The prism assembly and kernel configuration of FIG. 2 operates as follows. Polarized input light is input into a beam splitter (e.g., Magenta dichroic cube 102) that splits the input light into a first and second colored light beam. When utilizing a magenta dichroic based beam splitter as illustrated, the first colored light beam is a Magenta light beam, and the second colored light beam is a green light beam. Both the first and second light beams carry a same polarization as the input polarized light (a relative S-polarization as illustrated in FIG. 2).

The first colored light beam travels through turning prism 2 115 and is directed toward a first input face of "White" PBS 140. The "White" PBS 140 is a polarizing beam splitter that is, for example, constructed from two right angle prisms abutted on their diagonals, with one or both of the diagonals coated with a layer and/or layers that make up a polarizing beam splitting element (diagonal line running between non-adjacent corners of the "White" PBS 140). However, the "White" PBS 140, instead of operating as a beam splitter, is positioned such that the relative polarization of the first colored light beam reflects off the beam splitting layer and into dichroic cube 130.

The dichroic cube 130 is operative as a beam splitter and splits the first colored light beam into two component light beams, each of which are individually directed to a specific one of two processing faces of the dichroic cube 130 and the illustrated prism assembly. Each of the processing faces has a reflective type light modulator positioned to modulate and reflect light incident to the processing face on which it is mounted. The reflective type light modulators are, for example, reflective Liquid Crystal On Silicon (LCOS) microdisplays. Light incident upon the modulators is of a specific color. Each modulator is energized by a driver board on a pixel by pixel basis according to an amount of the modulator's corresponding color in each pixel of an image to be projected by the kernel. The reflective type light modulators operate, for example, by rotating polarization of light incident on the modulator by an amount corresponding to an amount of the modulator's corresponding color in the image. Thus the modulation imposed on each of the component light beams is an amount of polarization change that occurs at the light modulator.

The light modulators are, for example, microdisplays. As illustrated in FIG. 2, "Red" microdisplay 180 has a red component light beam, split from the first (magenta) colored light beam, directed to a processing face of the Yellow dichroic cube and prism assembly/kernel 100. The "Red" microdisplay is energized on a pixel by pixel basis according to an amount of red color in an image to be projected by the prism assembly/kernel 100. The red component light beam's modulated component is now polarized differently than when the red component light beam was first incident upon the "Red" microdisplay.

The red component light beam is split from the first (Magenta) colored light beam because is passes through a yellow dichroic layer of the yellow dichroic cube 130. A blue component light beam is also split from the first colored light beam because it is reflected from the yellow dichroic layer. The blue light component is modulated by the "Blue"

microdisplay 185 in a manner similar to the red light component except that the modulation is based on blue content of the image.

Once modulated, both the red and the blue component light beams are recombined and in the same manner they were split (red passing the dichroic layer, and blue reflected by the dichroic layer). The recombined first colored light beam then enters "White" PBS 140, now striking the beam splitting layer of the "White" PBS 140 with both unmodulated lights and modulated lights. The modulated lights have a polarization that is opposite the polarization needed for total reflection by the "White" PBS beam splitting layer (In this example, the beam splitting layer of the "White" PBS reflects light that is S-polarized relative to the "White" PBS beam splitting layer) Thus, according to an amount each portion of light in the beam was modulated (or is P polarized relative to the "White" PBS beam splitting layer), it is passed by the PBS layer as an output (e.g., Red P, and Blue P lights). Portions of light not passed by the beam splitting layer are reflected away from the output.

The second colored light beam, Green S-relative polarized light in the illustrated example, is reflected from Magenta dichroic layer through a half waveplate 104. The half waveplate 104 rotates the polarization of the second colored light beam 90 degrees, making it P-relative Green (GP). As shown in FIG. 2, the polarization rotated second colored light beam passes through spacer cube 105 and is directed by turning prism 1 110 toward "Green" PBS 120. An orientation of the "Green" PBS 120 is such that the polarization rotated second colored light beam is reflective as to a beam splitting layer (PBS layer) of the "Green" PBS. The "Green" PBS beam splitting layer is illustrated as a layer between the abutted diagonals of two right angle prisms from which the "Green" PBS is constructed. Relative to the orientation of the "Green" PBS, the polarization rotated second colored light beam is S-polarized, or reflective upon impact with the "Green" PBS beam splitting layer and the second colored light beam is therefore reflected toward a processing face of the "Green" PBS 120. The processing face has a reflective type light modulator (e.g., microdisplay) mounted such that light directed toward the processing face enters the light modulator. The light so entering the modulator is modulated and reflected back toward the "Green" PBS 120. As with the previously described modulations, the second colored light beam now includes a modulated component whose polarization has been changed enough to pass the beam splitting layer of the PBS 120. The modulated component is P polarized relative to the PBS 120.

The orientation of the "White" PBS 140 is such that P-relative modulated light from the PBS 120 is S relative polarized with respect to the beam splitting layer of the "White" PBS 140. Thus upon striking the "White" PBS 140 beam splitting layer, the modulated second colored light beam is reflected toward the output as it is combined with the modulated first colored light beam.

The prism components can be glued together directly or liquid coupled as disclosed, for example, in the pending utility patent application entitled "Method and Apparatus for Configuration and Assembly of a Video Projection Light Management System" by Detro and Berman and assigned No. 10/202,595 on Jul. 24, 2002. Preferably, each of the prism components including "Green" PBS 120, Yellow dichroic cube 130, and "White" (or output) PBS 140, and Magenta dichroic cube 102 are set in pathlength matched positions such that the component light beams travel equivalent distances before being output from PBS 140. In one embodiment, pathlength matching is performed only for lightpaths encountered by the modulated lights (e.g., red, green, and blue modulated lights traveling pathlength matched paths, or light channels, between each microdisplay and an output face of the "White" PBS 130).

To facilitate any such pathlength matching, "Green" PBS 120, Yellow dichroic cube 130, "White" (or output) PBS 140, and Magenta dichroic cube 102, each of which may be generically described as beamsplitters, may be set in pathlength matched positions including gaps between adjacent faces of the beam splitters. (Note: as can be seen in FIG. 2, Output beamsplitter 140 is oriented 90 degrees with respect to "Green" PBS 120. (Thus, similarly constructed Polarizing Beam Splitting cubes may be utilized and provide for the proper reflections of different relative polarizations of light as described herein) The gaps are sealed, for example, around a perimeter of the gaps with any one or more of adhesive, an external frame, or a plate (e.g., another piece of glass), and the gaps are filled with an optical coupling fluid having an index of refraction that closely matches the glass components.

The half waveplate 104 may be fitted in a gap between Magenta dichroic cube 102 and spacer cube 105. A corresponding spacer waveplate (e.g., blank 118) may be placed between turning prism 115 and "White" PBS 140.

In one embodiment, the half waveplate is a compensated higher order waveplate, and the spacer waveplate is a blank matching the compensated higher order waveplate so as to add an optical pathlength in the path of the first colored light beam equivalent to what is added by the half waveplate in the second colored light beam. Although not required, compensated higher order waveplates may be utilized. Further discussion related to structure and construction techniques for compensated higher order waveplates may be found in Berman et al., U.S. patent application Ser. No. 10/371,835, entitled "METHOD AND APPARATUS FOR USE AND CONSTRUCTION OF COMPENSATED HIGHER ORDER WAVEPLATES", filed Feb. 20, 2003, which is incorporated herein by reference in its entirety.

In one embodiment, to further facilitate the pathlength matching, each of the "Green" PBS 120, Yellow dichroic cube 130, "White" (or output) PBS 140, and Magenta dichroic cube 102 beam splitters are themselves constructed as pathlength matched beam splitters.

Figure 3:
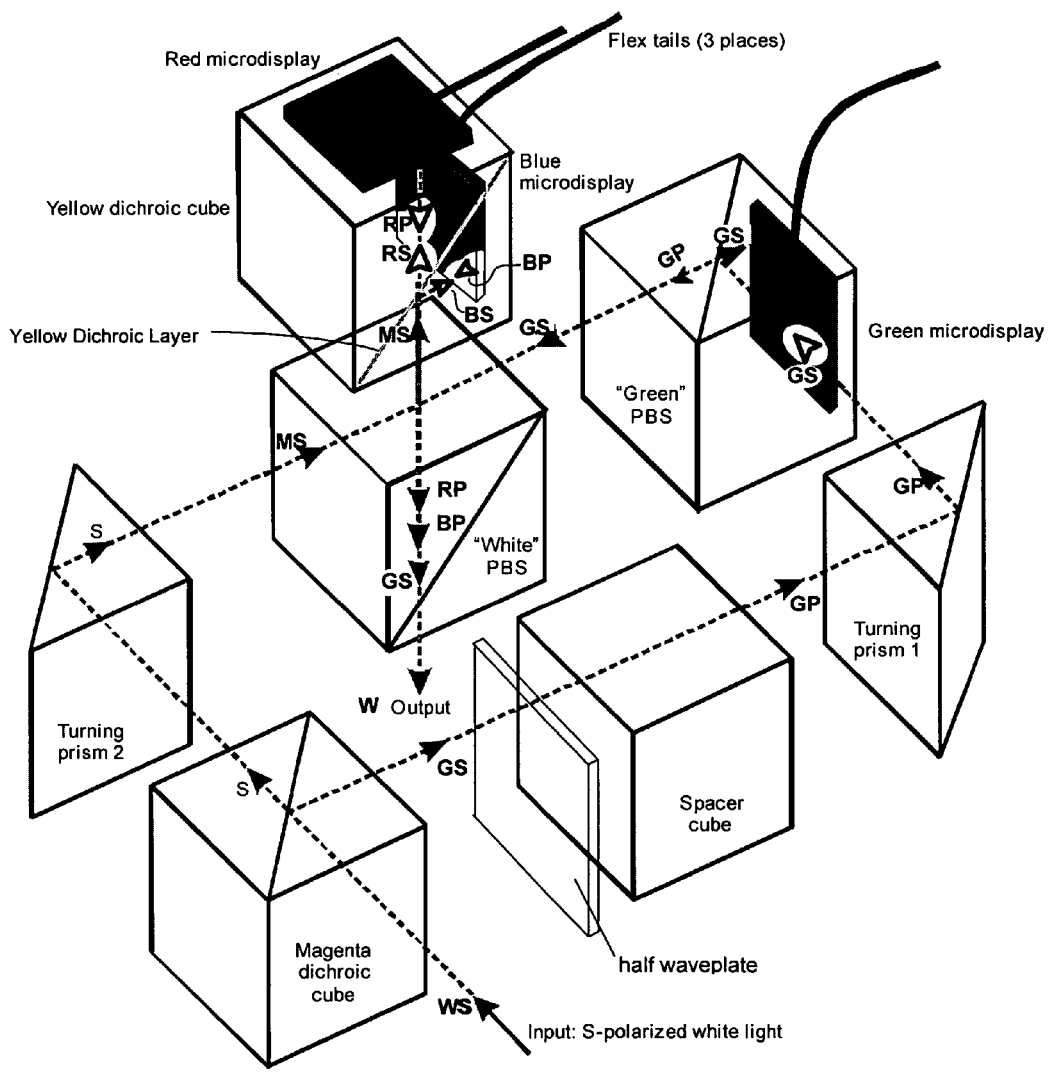
FIG. 3 is a drawing of a 3D kernel according to another embodiment of the present invention.

The present invention includes pathlength matching in the design of kernels discussed herein. Although not required, the kernel itself may be constructed using pathlength matched beam splitters and construction techniques for pathlength matched prism assemblies, all of which may be utilized in conjunction with the configurations of FIG. 2 and FIG. 3 and/or any variations thereof to produce an efficient, essentially stress free, and pathlength matched prism assembly or kernel. Detro, U.S. patent application Ser. No. 10/251,225, entitled "PATHLENGTH MATCHED BEAM SPLITTER AND METHOD AND APPARATUS FOR ASSEMBLY", filed Sep. 20, 2002 and issued on Oct. 26, 2004 as U.S. Pat. No. 6,809,874, and Detro (II), U.S. patent application Ser. No. 10/939,180, entitled "A PATHLENGTH MATCHED BEAM SPLITTER AND METHOD AND APPARATUS FOR ASSEMBLY", filed Sep. 10, 2004, the contents of each of which are incorporated herein by reference in their entireties, and each of which describe techniques for producing pathlength matched beamsplitters. Constructing the prism assemblies themselves may be done by preparing a jig with stops such that the surfaces of the beam splitters are set in path length matched positions and gaps between the prisms (of varying widths depending upon the uniformity of the beam splitters) are filled with an index matching fluid preferably having an index of refraction closely matching the index of refraction of the beam splitters and any optical elements placed between the beam splitters. Berman et al. (II), U.S. patent application Ser. No. 10/202, 595, entitled "METHOD AND APPARATUS FOR CONFIGURATION AND ASSEMBLY OF A VIDEO PROJECTION LIGHT MANAGEMENT SYSTEM", filed Jul. 24, 2002, the contents of which are incorporated herein by reference in its entirety, provides additional discussion and examples of techniques that can be applied to certain Note that the prism assembly configuration of FIG. 2 is most suitable for use with microdisplays constructed in the portrait orientation. In this case the flex tail of the red and blue microdisplays are straight while the flex tail from the green microdisplay requires only a simple 90 degree bend for all flexes to extend in the same direction. This greatly simplifies connection to a drive board. For the same reason, the configuration disclosed in FIG. 3 is most suitable for use with microdisplays oriented in the landscape configuration.

A trim filter can be included at the input surface of the prism assembly. The filter can be a separate component or a thin film deposited directly onto the glass surface (e.g., input face 103). The trim filter removes undesired parts of the input spectrum.

In some applications it is desirable for the light exiting the kernel to be unpolarized. In such cases a high order waveplate can be placed at or on the output face of the prism assembly. The high order waveplate serves to depolarize the output light. Although the prism assembly/kernel is preferably made without any WDWs, if the output light for a particular application needs to be linear polarized in one direction, an appropriate Color Select (WDW) may be placed at the output.

Figure 1:
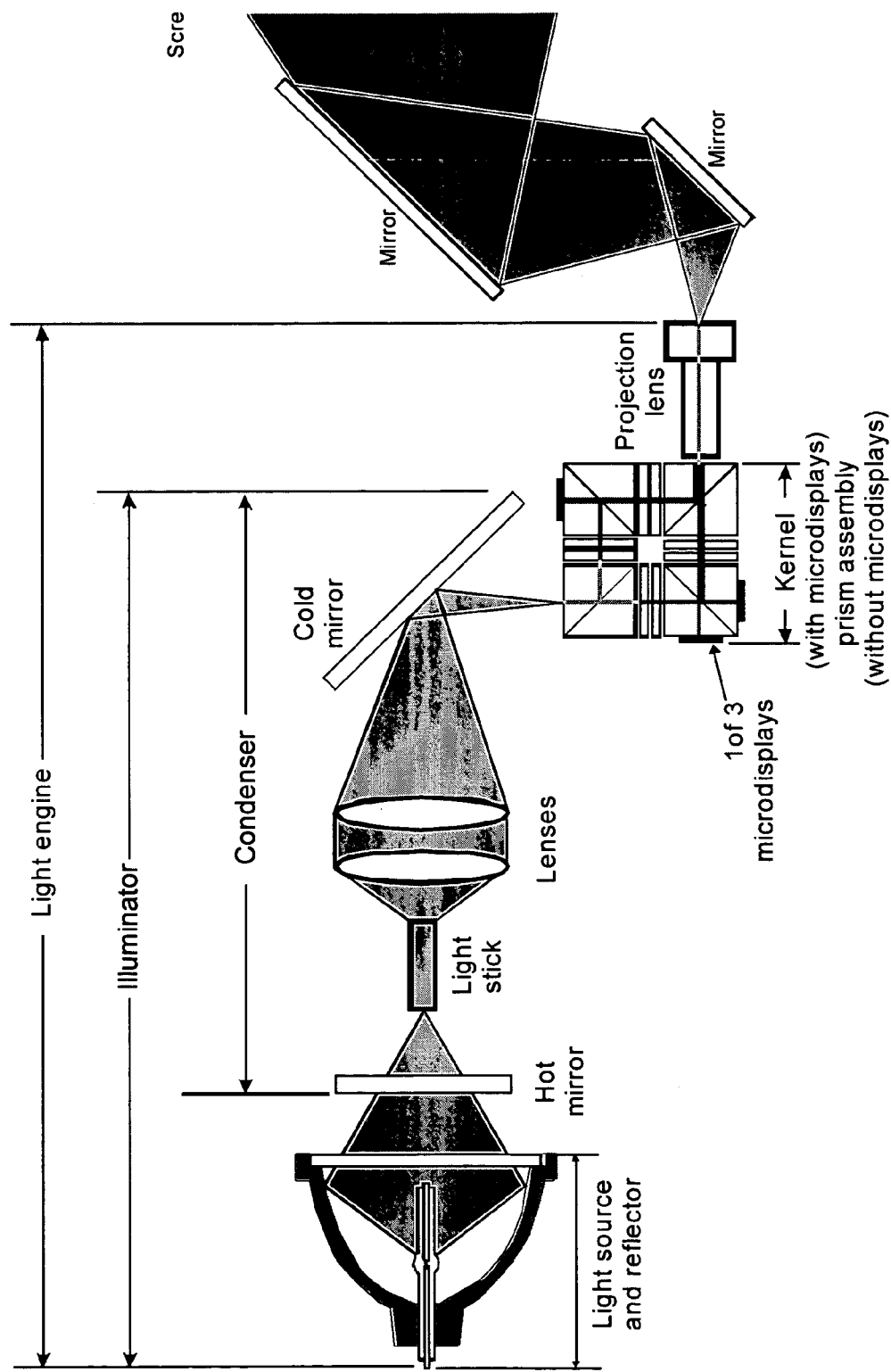
FIG. 1 is a drawing of a light engine for a projection device.

FIG. 1 illustrates a light engine and a kernel where each light beam within the kernel remain in a same plane. Kernels constructed according to the design discussed with respect to FIGS. 2 and 3 have light beams which do not stay in a same plane within the kernel. Any of the kernels described above may be utilized in a light engine of a projector or television, or monitor device. In one embodiment, a kernel according to the present invention is substituted for the kernel shown in FIG. 1. The resulting projector is then utilized in a front projection system or a High Definition (HD) Rear Projection Television (RPTV).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing beamsplitter shaped as a cube, it should be understood that a non cube shaped beamsplitter, or any other equivalent device having an equivalent function or capability, whether or not listed herein, may, in at least some cases, be substituted therewith. All other described items, including, but not limited to microdisplays, electrical connections, circuit board arrangements, dichroic layers, polarizing layers, polarizations, prisms, and materials used to construct the items, etc., should also be considered in light of any and all available equivalents.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is:

1. A kernel, comprising:
a set of beamsplitters and optical components arranged to split an incoming light beam into a set of component color light beams, individually direct each component color light beam to a corresponding one of a set of microdisplays configured to modulate the component color light beam;
wherein the set of beamsplitters are arranged in a 3D configuration;
a "white" polarized beamsplitter cube; and
a yellow dichroic modulating cube, wherein the yellow dichroic modulating cube is arranged to split light up, and the "white" polarized beamsplitter cube is arranged to direct unmodulated light up to the yellow dichroic modulating cube and pass modulated light from the yellow dichroic modulating cube toward an output.

2. The kernel according to claim 1, wherein the 3D configuration comprises individual light paths of each of the component color light beams do not stay in a same plane within the kernel.

3. The kernel according to claim 1, wherein the kernel is configured to split the incoming light into red, green, and blue light beams and individually direct the red, green, and blue light beams.

4. The kernel according to claim 1, wherein the set of beamsplitters includes:
a set of two turning prisms; and
at least two polarized beamsplitters.

5. The kernel according to claim 1, wherein the set of beamsplitters includes a magenta dichroic cube.

6. The kernel according to claim 1, wherein the beamsplitters are placed in path length matched positions such that each microdisplay may be directly mounted on the prism assembly and be in a pathlength matched position without adjusting a gap between the prism assembly and the microdisplay.

7. The kernel according to claim 1, wherein the set of microdisplays are mounted on processing surfaces of the prism assembly and arranged on the prism assembly such that flex tails from the microdisplays emanate toward a control board of a device in which the kernel is mounted.

8. The kernel according to claim 7, wherein the kernel is mounted in a high definition liquid crystal on silicon rear projection television.

9. The kernel according to claim 1, wherein the set of beamsplitters includes:
a magenta dichroic input cube configured to split incoming light into a magenta light beam and a green light beam;
a first turning prism configured to turn the magenta light beam, wherein the "white" polarized beamsplitter is configured to redirect the magenta light beam toward the yellow dichroic modulating cube and wherein the yellow dichroic modulating cube is configured:
to split the magenta light beam into red and blue light beams;
modulate the red and blue light beams; and
recombine the red and blue light beams into a modulated magenta light beam.

10. The kernel according to claim 9, wherein the set of beamsplitters includes:
- a second turning cube configured to turn the green light beam; and
- a "green" polarized beamsplitter configured to modulate the green light beam and direct the modulated green light beam.

11. The kernel according to claim 1, wherein the "white" polarized beamsplitter cube is further configured to reflect modulated green light toward the output.

12. A method, comprising:
- separating an input light beam into a set of at least three component color light beams in a kernel, the kernel including:
  - a set of beamsplitters and optical components arranged to split an incoming light beam into a set of component color light beams, wherein the set of beamsplitters are arranged in a 3D configuration;
  - a "white" polarized beamsplitter cube; and
  - a yellow dichroic modulating cube;
- individually directing each of the at least three component color light beams to a corresponding one of a first, a second, and a third microdisplays configured to modulate and reflect the corresponding component light beams, wherein the component color light beams are directed in a plane different from a plane of the input light beam; and
- recombining the modulated light beams into a modulated output beam.

13. The method according to claim 12, further comprising installing the kernel in an high definition liquid crystal on silicon rear projection television.

* * * * *